United States Patent [19]

Nishino et al.

[11] Patent Number: 4,672,662
[45] Date of Patent: Jun. 9, 1987

[54] SWITCHING SYSTEM AND METHOD FOR NETWORK HAVING A PLURALITY OF TERMINAL CONTROL EQUIPMENT UNITS

[75] Inventors: Tetsuo Nishino; Hiroko Okamura; Yasunori Yamatani, all of Kawasaki, Japan

[73] Assignee: Fujitsu Limited, Kawasaki, Japan

[21] Appl. No.: 734,110

[22] Filed: May 15, 1985

[30] Foreign Application Priority Data

May 17, 1984 [JP] Japan ................. 59-097571

[51] Int. Cl.$^4$ ........................................... H04Q 11/04
[52] U.S. Cl. ...................................... 379/277; 370/96
[58] Field of Search ........... 179/18 AB, 2 DP, 18 ES, 179/81 R, 8 A; 370/96, 67, 85

[56] References Cited

U.S. PATENT DOCUMENTS 4,394,756  7/1983  Canniff ................. 179/18 AB X

FOREIGN PATENT DOCUMENTS 58-151197A  9/1983  Japan .

OTHER PUBLICATIONS

Skaperda et al., "Anforderungen und Losungswege fur das Digitalvermittlungssystem EWDS im ISDN" Telcom Report, vol. 6, No. 3, Jun. 1983, pp. 174–179.
Jajafi, "Techniques for Implementation of ISDN Terminals", IEEE International Conf. on Communications, Links for the Future, vol. 1, May, 1984, pp. 281–284.
Fink et al., "System Concept of a PABX Integrating Voice and Data", IEEE International Conf. on Communications, Links for the Future, vol. 1., May, 1984, pp. 141–144.
Bourgonje, "Twisted-pair bus carries speech, data, text and images", Electronics Design, vol. 32, No. 15, Jul. 1984, pp. 171–176, 178.

*Primary Examiner*—James L. Dwyer
*Attorney, Agent, or Firm*—Staas & Halsey

[57] ABSTRACT

A switching system for a network having terminal control equipment units connected to a network termination unit, in which terminal control equipment units of the same kind are connected with an exchange through a subscriber's line which has assigned to it a single subscriber number and which has a plurality of communication channels. The system including storage units for each terminal control equipment unit of the subscriber's line for storing call status of incoming calls. When a first incoming call is received, the storage units of the terminal control equipment units set respective call status for the first incoming call to a ringing state. When a second incoming call is received before a response to the first incoming call is transmitted, the storage units also set the call status for the second incoming call to a ringing state. When any one of the terminal control equipment units in the ringing state delivers a response, the call status for the first incoming call of the terminal control unit delivering the response is set to an active state and the call status for the first incoming call of the other terminal control units in the ringing state are released. The call status for the second incoming calls are maintained.

5 Claims, 16 Drawing Figures

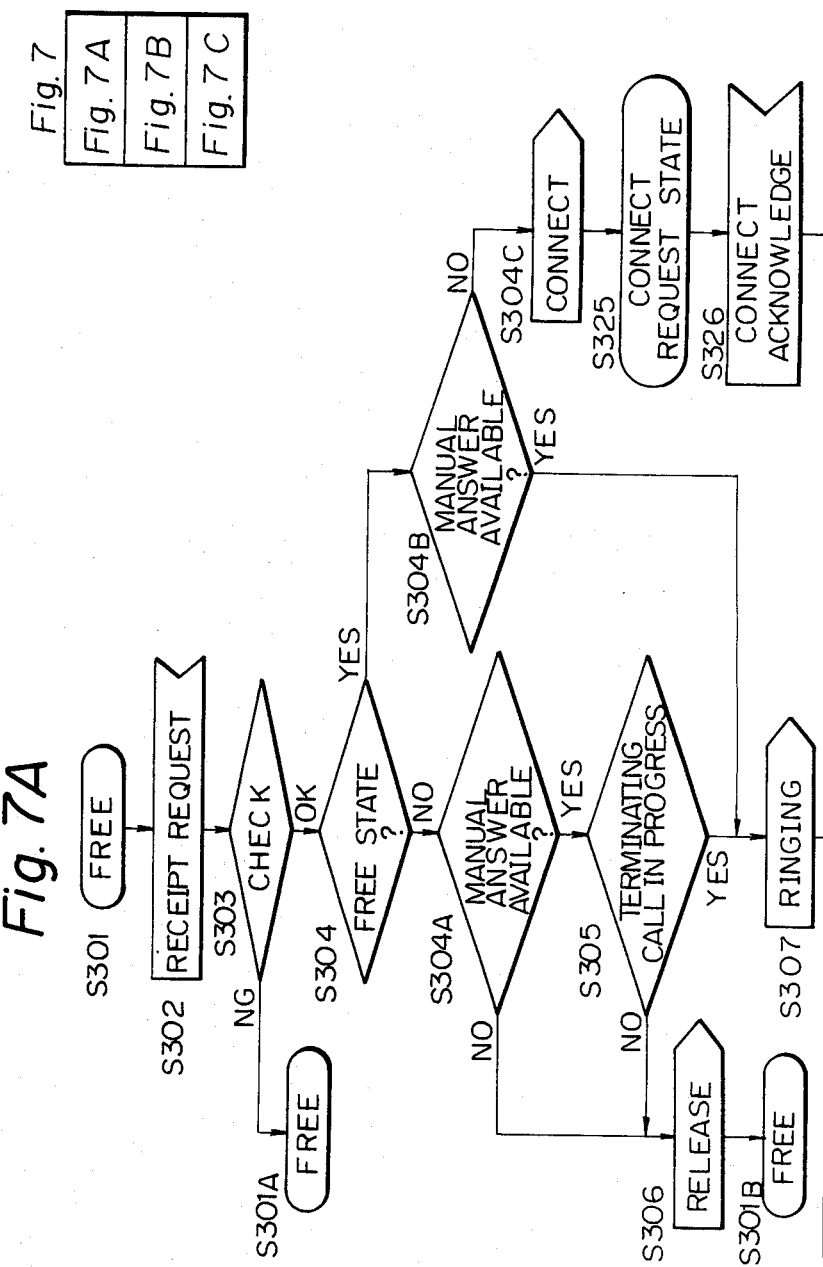

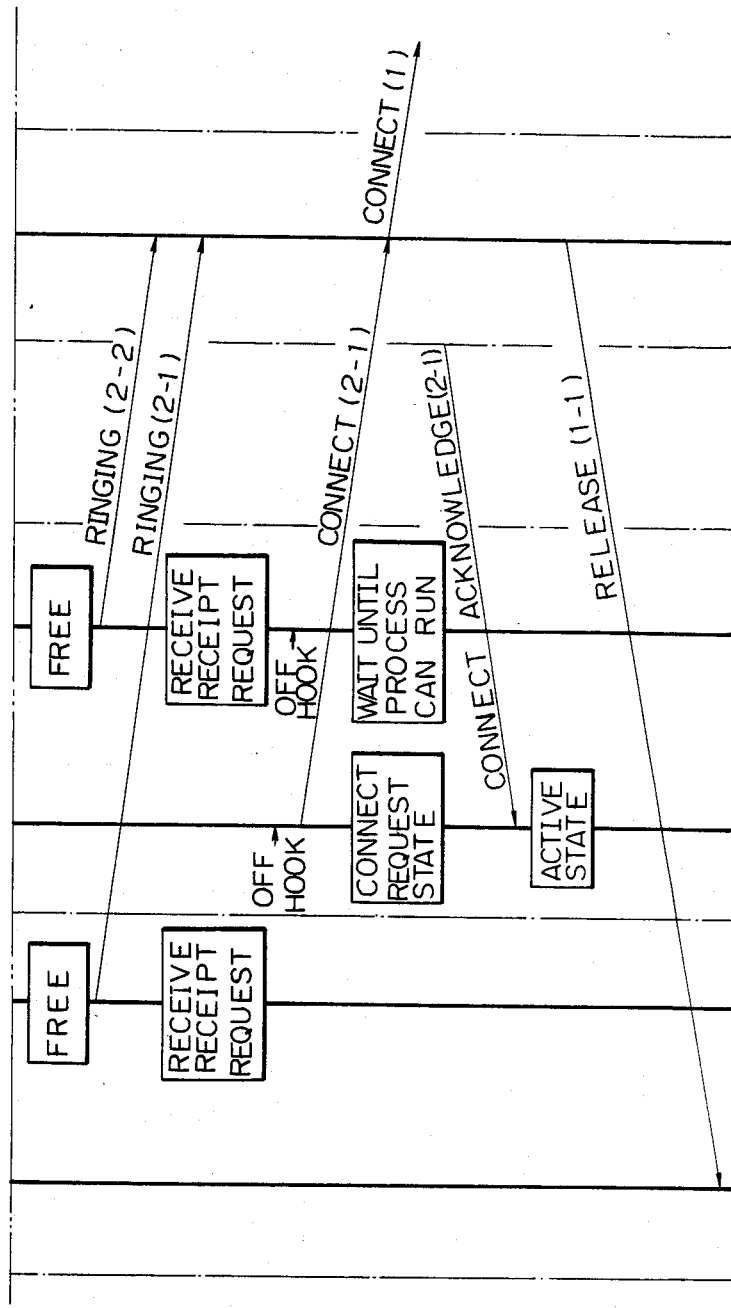

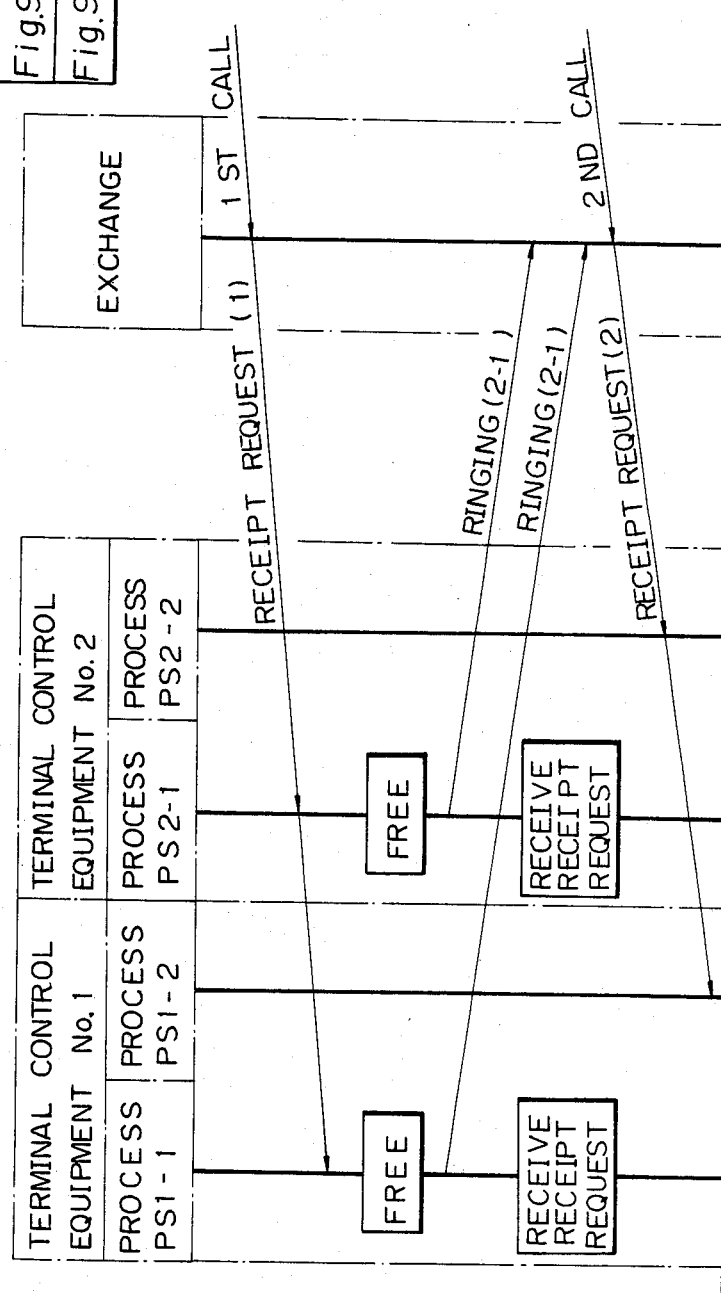

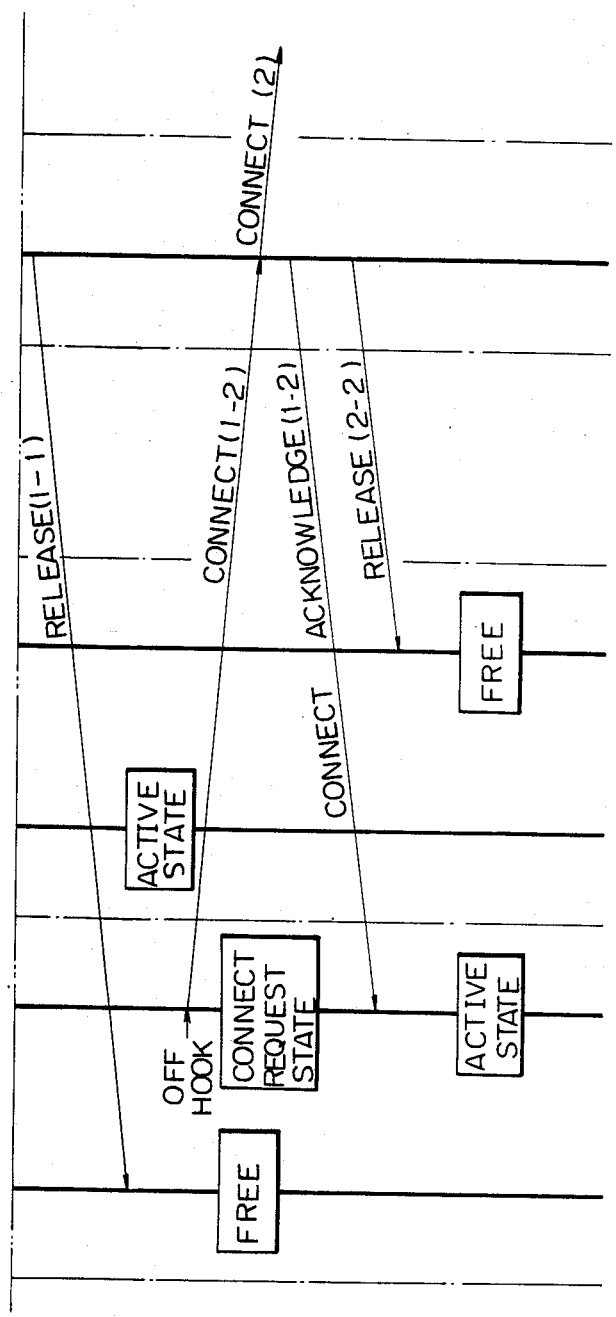

SWITCHING SYSTEM AND METHOD FOR NETWORK HAVING A PLURALITY OF TERMINAL CONTROL EQUIPMENT UNITS

BACKGROUND OF THE INVENTION

1. Field of the Invention

The present invention relates to a system and method for controlling simultaneous arrival of two or more calls and more particularly, to a system and method which enables separate connection control in response to simultaneous arrival of a plurality of calls in a switching system having a plurality of terminal control equipment units connected to a network termination unit and an arbitrary number of separate terminals connected with each terminal control equipment unit.

2. Description of the Related Art

In a known system developed for use in an integrated services digital network (ISDN), a network termination unit is connected with a digital exchange through digital subscriber lines and a plurality of terminal control equipment units. The terminal control equipment units can in turn be connected to telephone sets, facsimile devices, data terminals, telex terminals, and so on.

Various combinations of channels have been proposed. For example, there is a system using several B channels of 64 Kb/s as communication channels and a D channel of 16 Kb/s as a channel for a control signals and slow packets thus combining a plurality of B channels with a D channel.

Since two or more B channels are established for communication between an exchange and the terminal control equipment units, both a first incoming call and a second incoming call may be received at the same time. With the arrival of the first incoming call, however, the terminal control equipment units enter into an alerting state. When the second incoming call arrives, the terminal control equipment units send release signals because of the "busy" state for the second incoming call.

As described above, when two or more incoming calls arrive simultaneously, the exchange receives a ringing signal when a first incoming call is received. It therefore processes other incoming calls as in a "busy" state even if some B channels are free. Thus, when two or more incoming calls arrive, connect processing is possible only for the first incoming call. This is disadvantageous from the viewpoints of serviceability as well as the efficient utilization of the system.

SUMMARY OF THE INVENTION

It is an object of the present invention to provide a switching system, for a network having a plurality of terminal control equipment units connected to a network termination unit, for enabling separate connection control even under conditions of simultaneous arrival of a plurality of calls.

It is another object of the present invention to provide a switching system, for a network having a plurality of terminal control equipment units connected to a network termination unit, which features improved serviceability and utilization.

According to an aspect of the present invention, there is provided a switching system for a network having a plurality of terminal control equipment units connected to a network termination unit. The terminal control equipment units are of the same kind and are connected with an exchange through a subscriber's line which has assigned to it a single subscriber number and which has a plurality of communication channels. The system includes storage means for each terminal control equipment unit of the subscriber's line for storing call status of incoming calls. When a first incoming call is received, the storage means of the terminal control equipment units set respective call status for the first incoming call to a ringing state. When a second incoming call is received before a response to the first incoming call is transmitted, the storage means also sets the call status for the second incoming call to a ringing state. When any one of the terminal control equipment units in the ringing state delivers a response, the call status for the first incoming call of the terminal control unit delivering the response is set to an active state and the call status for the first incoming call of the other terminal control units in the ringing state are released. The call status for second incoming calls are maintained.

According to another aspect of the present invention, there is provided a method for controlling the simultaneous arrival of a plurality of calls in a switching system having terminal control equipment units connected to an exchange termination through a digital subscriber's line. Each of the terminal control equipment units includes a first decision unit for deciding whether or not a terminal is free; a second decision unit for deciding whether or not an incoming call terminating state is in progress when the decision of the first decision unit is that a terminal is not in a free state; and an execution unit for executing processes corresponding to plural call terminations. The terminating control is carried out so that a ringing signal is sent back to the exchange when the decision of said first decision unit is that a terminal is not in a free state and the decision of said second decision unit is that an incoming call terminating state is in progress, and a connect signal as, a terminal's answer is sent to the exchange by executing the process for the incoming call.

DESCRIPTION OF THE PREFERRED EMBODIMENTS

Before describing the preferred embodiments, a more detailed explanation will be made of the prior art for reference purposes.

Figure 1:
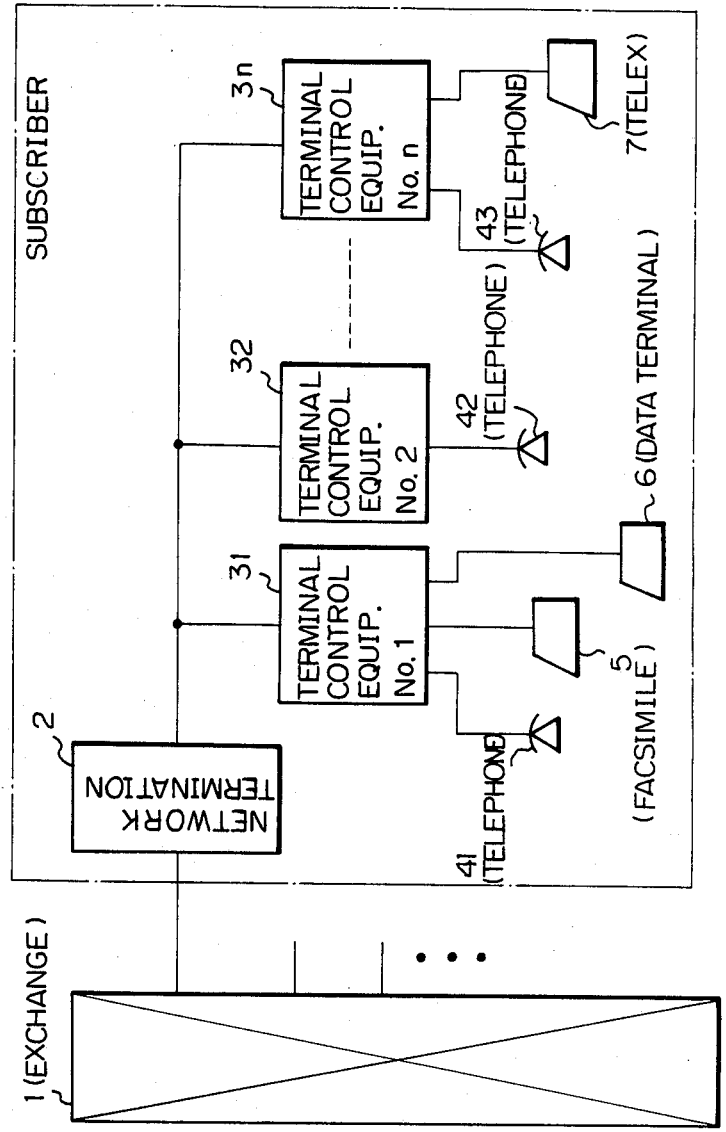
FIG. 1 is a schematic block diagram explaining a switching system to which the present invention is applied.

FIG. 1 is a schematic block diagram explaining a switching system to which the present invention is applied. In the figure, reference numeral 1 is an exchange, 2 a network termination unit, 31 to 3N terminal control equipment units, 41, 42, and 43 telephone sets, 5 a facsimile device, 6 a data terminal, and 7 a telex terminal.

Figure 2:
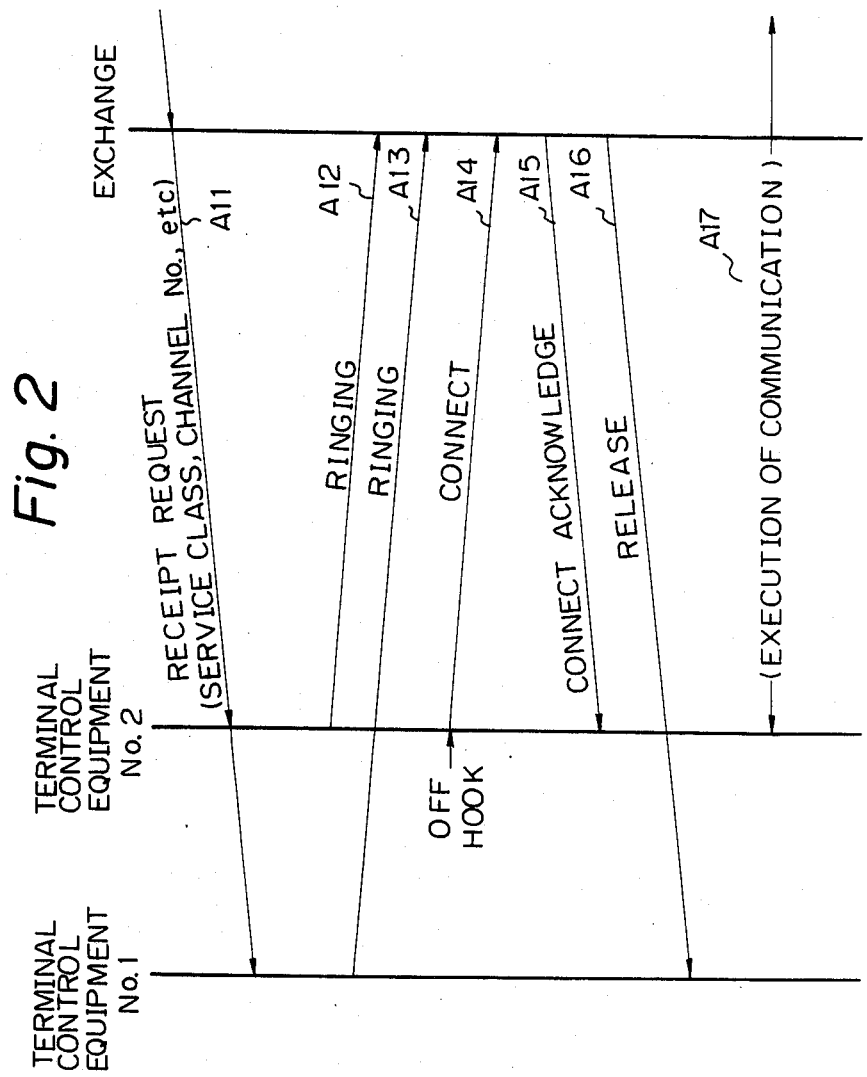
FIG. 2 shows a sequence for terminating a connection.

FIG. 2 explains a sequence of terminating a connection for terminal control equipment units 31 and 32, and the exchange 1. When the exchange 1 receives a receipt request signal A11, it transfers the receipt request signal A11 to the terminal control equipment units 31 and 32 through the network termination unit 2. Service facility information indicating the type of originating terminal, e.g., the telephone sets 41 and 42 or the facsimile device 5, information indicating the number of the channel reserved as a communication channel, and other information are annexed to the signal A11. The terminal control equipment units 31 and 32 which accommodates terminals corresponding to the service facility, send a ringing tone to the terminals and, at the same time, send back to the exchange 1 ringing signals A12 and A13 showing that the terminals are in a ringing state.

If a terminal of the terminal control equipment unit 32 answers, the terminal control equipment unit 32 sends a connect signal A14 to the exchange 1. When the exchange 1 receives the connect signal A14, it sends a connect acknowledge signal A15 to the terminal control equipment unit 32. This enables the terminal accommodated by the terminal control equipment unit 32 to communicate with the originating terminal. After the exchange 1 has sent the connect acknowledge signal A15 to the terminal control equipment unit 32, it sends a release signal A16 to the other terminal control equipment unit 31. After the terminal control equipment unit 31 receives the release signal A16, it awaits the arrival of the following receipt request signal A11 or an originating operation by an accommodated terminal.

Figure 3:
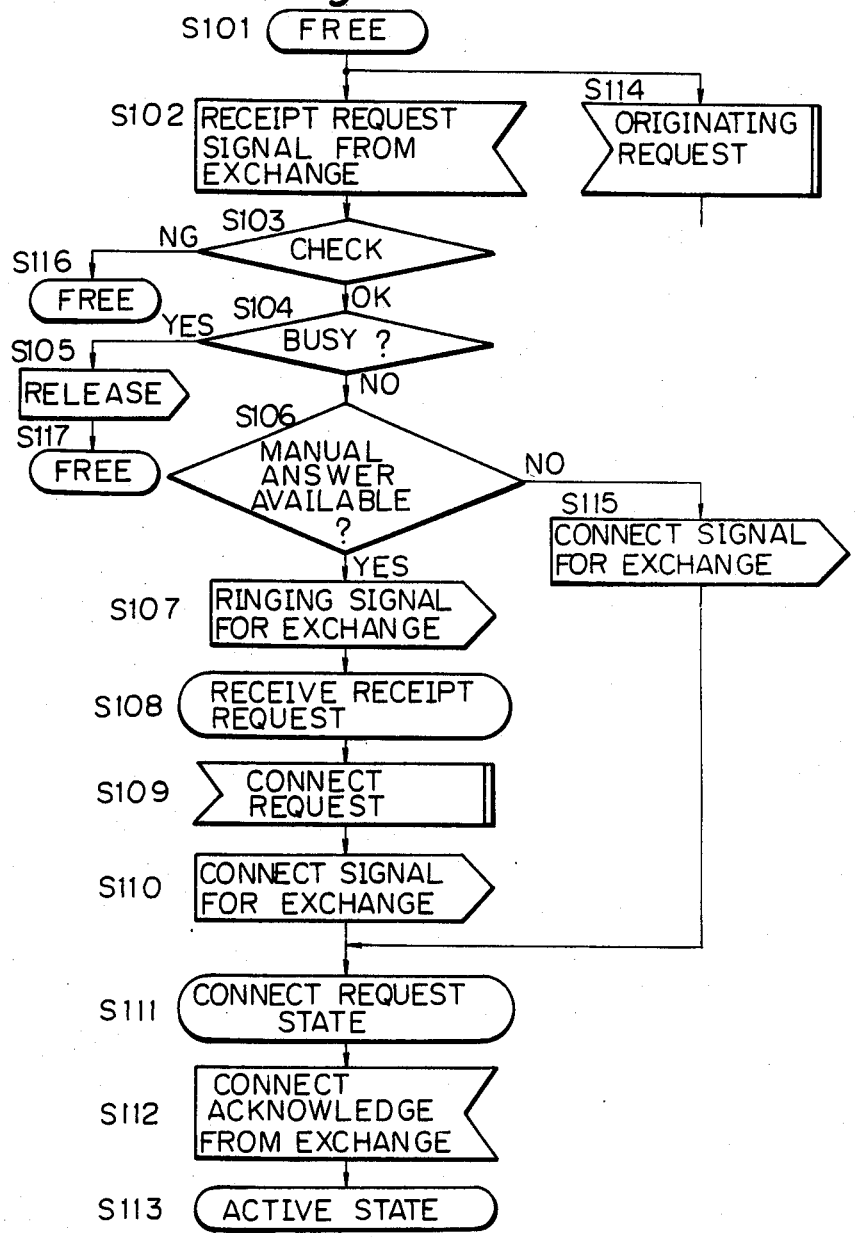
FIG. 3 is a flow chart of the terminating operation of a terminal control equipment unit in the prior art.

FIG. 3 is a flow chart showing the operation of a conventional terminal control equipment unit at the time of an incoming signal. In the figure, the steps S101, S116, S117, S108, S111 indicate stable states in call processing, the steps A102 and S114 indicate a request is made during call processing, and the steps S103 and S104 indicate process branching. When the terminal control equipment unit is in a free state, that is, a non-processing state, and receives a receipt request signal from the exchange (step S102), it checks the service facility information (step S103).

The above-described check is called a compatibility check. When the result of the check is "NG", i.e., the terminal control equipment unit accommodates a different sort of terminal than the originating terminal, the terminal control equipment unit returns to the first free state (step S101). When the result of the check is "OK", a check is made as to whether the terminal control equipment unit is busy or not (step S104). If busy, the terminal control equipment unit sends a release signal to the exchange (step S105) and returns to the first free state (step S117). If not busy, a check is made as to whether the terminal of the unit is a manual connect terminal, e.g., telephone set (step S106). If it is a manual connect terminal, the terminal control equipment unit sends a ringing signal to the exchange 1 (step S107), enters a state to receive a receipt request signal S108, and enters an operative state for sending a ringing tone, etc. (step S108). When a terminal issues a connect request signal based on an off-hook operation, etc. (step S109), the terminal control equipment unit sends a connect signal to the exchange 1 (step S110).

If the terminal is an automatic connect terminal, such as a telex unit, the terminal control equipment unit automatically sends a connect signal to the exchange change 1 (step S115).

When the terminal control equipment unit sends a connect signal to the exchange 1 (steps S110 and S115), it enters a connect request state (step S111). When it receives a connect acknowledge signal from the exchange 1 (step S112), it establishes a channel and enters an active state (step S113). Moreover, when a terminal sends an originating request signal (step S111), the terminal control equipment unit performs originating call connect processing. This has nothing to do with the present invention, so a further explanation is omitted herein.

Figure 4:
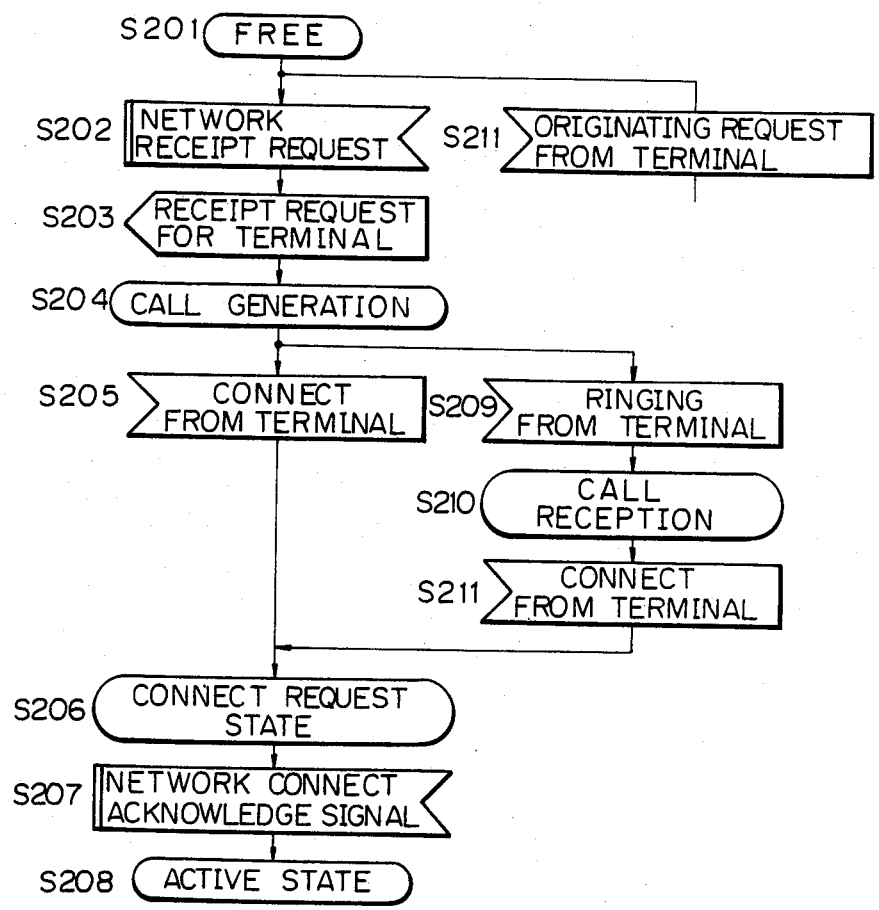
FIG. 4 is a flow chart of the terminating operation of an exchange.

FIG. 4 is a flow chart showing operations on the exchange side. When the exchange receives an incoming call in the free state (step S201), it processes a network receipt request (step S202) and sends a receipt request signal to the terminal control equipment units through a network termination unit (step S203). The exchange then enters a call generating state (step S204). When a terminal is a manual connect terminal, the exchange receives a ringing signal (step S209) and proceeds to the step of call reception (step S210). When the exchange receives a connect signal from the terminal control equipment unit (step S211), it enters a connect request state (step S206). When the terminal is an automatic connect terminal, the exchange does not receive a ringing signal, but directly receives a connect signal (step S205) to enter a connect request state (step S206). Then, it processes a network connect acknowledge signal (step S207), forms a network path, and enters an active state (step S208).

Figure 5:
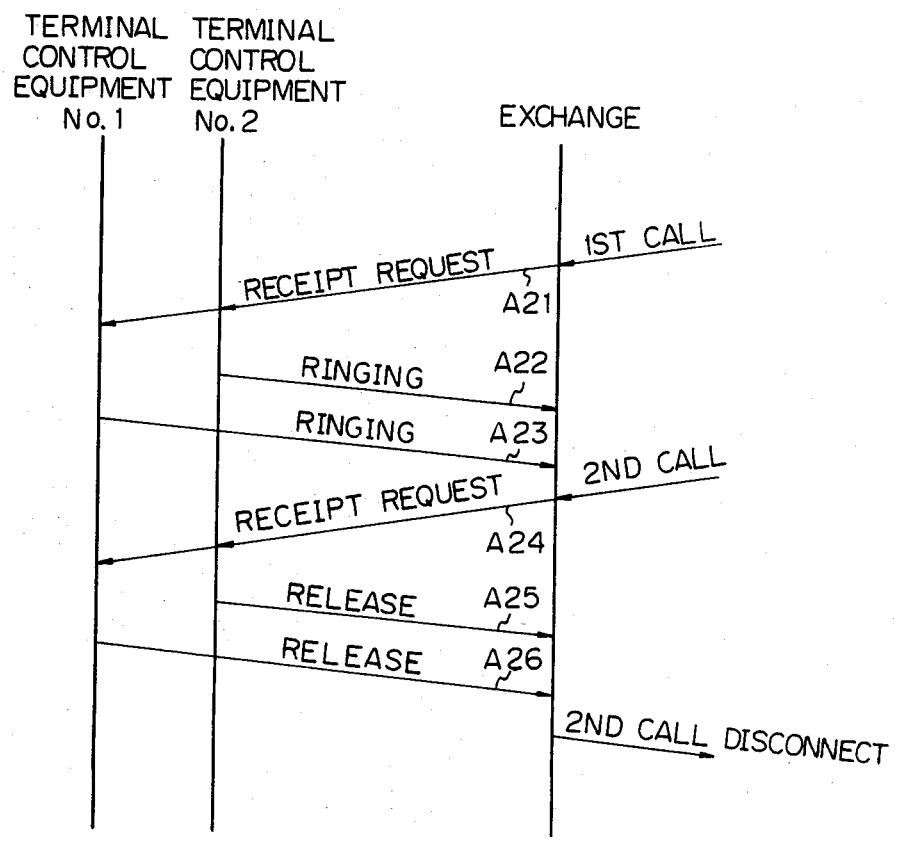
FIG. 5 explains the case of simultaneous arrival of two or more calls in the prior art.

As described above, since two or more B channels are established for communication between the exchange 1 and the terminal control equipment units, both first and second incoming calls may be received at the same time. With the arrival of the first incoming call, the terminal control equipment units enter into an alerting state. When the second incoming call arrives, the terminal control equipment units send release signals because of the "busy" state for the second incoming call. As shown in FIG. 5, the exchange 1 sends a receipt request signal A21 resulting from the first incoming call to terminal control equipment units 31, 32. The terminal control equipment units 31 and 32 send back ringing signals A22 and A23. If the exchange 1 sends a receipt request signal A24 resulting from a second incoming call before one of the terminal control equipment units 31 and 32 sends a connect signal, the terminal control equipment units 31 and 32 send release signals A25 and A26 indicating they are busy. Consequently, the exchange 1 sends a second call disconnect signal and sends a busy signal to the corresponding originating terminal for the second incoming call.

As described above, when two or more incoming calls arrive simultaneously, the exchange receives a ringing signal for the first incoming call and processes other incoming calls as if busy notwithstanding the existence of free B channels.

Figure 6:
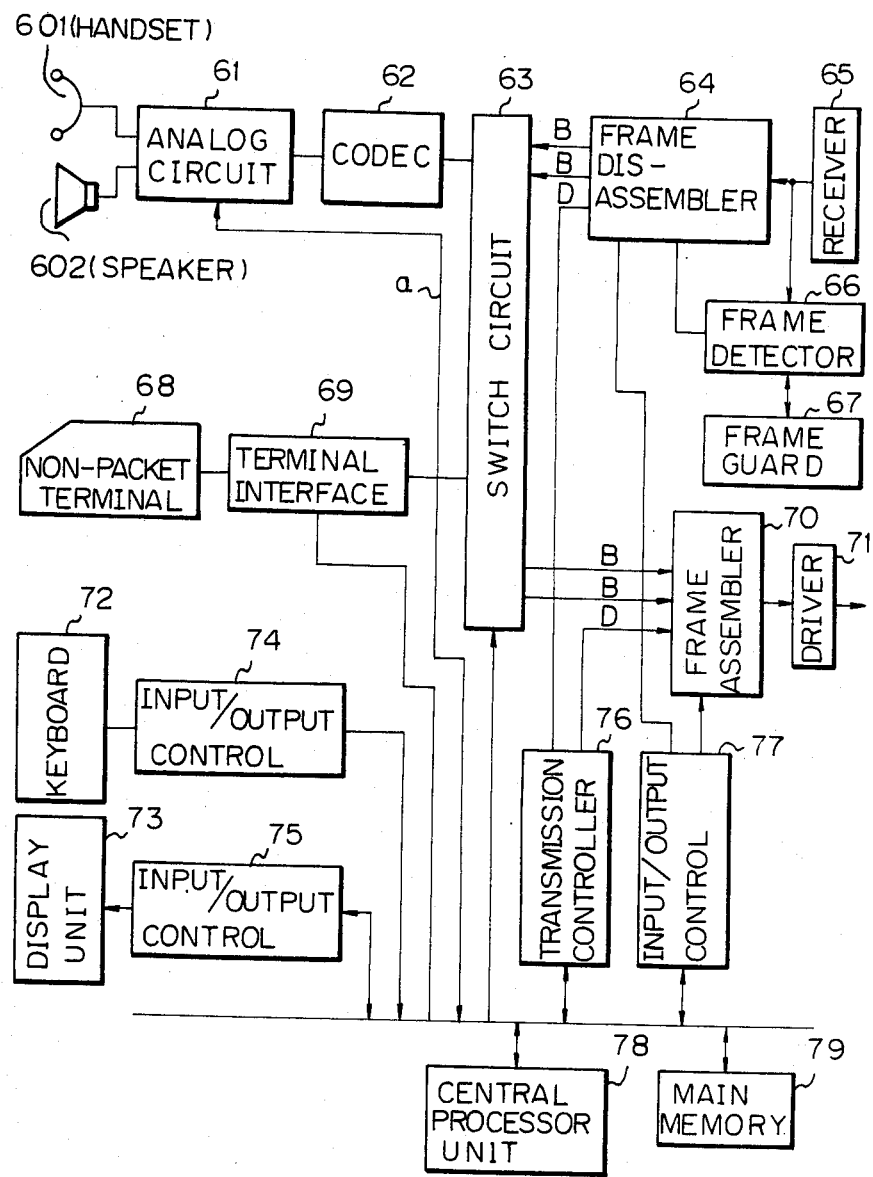
FIG. 6 is a block diagram of a main portion of a terminal control equipment unit in an embodiment of the present invention.

FIG. 6 is a block diagram of the main portion of a terminal control equipment unit in an embodiment of the present invention. In the figure, 601 is a handset, 602 a speaker/microphone, 61 an analog circuit for processing a voice signal, 62 a codec, 63 a switch circuit, 64 a frame disassembler, 65 a receiver, 66 a frame detector, 67 a frame guard circuit, 68 a data terminal, 69 a terminal interface, 70 a frame assembler, 71 a driver, 72 a keyboard, 73 a display unit for displaying transmitted and received data or the status of each portion, 74, 75 and 77 input/output control units, 76 a D-channel transmission controller unit, 78 a central processing unit, 79 a main memory for storing programs, and a a control line. A time division multiplex line can be used for the subscriber's line for the terminal control equipment.

The construction shown in FIG. 6 is for the case where two B channels and one D channel are provided. When a receipt request signal from the exchange 1 (refer to FIG. 1) is received by the receiver 65, frame synchronization is carried out by the frame detector 66. Disassembly of the two B channels and one D channel is performed by the frame disassembler 64. The D channel interacts with the central processing unit 78 through the transmission controller unit 76. The receipt request signal from the exchange is transmitted by the D channel.

The check on the service facility information and other information attached to the receipt request signal is performed under control of the central processing unit 78.

The central processing unit 78 controls the switch circuit 63 according to the service facility information. When the terminating operation of a telephone is indicated, it connects the designated B channel with the codec 62. The ringing signal etc. may be formed by reading out patterns stored in the main memory 79, etc. under the control of the central processing unit 78. The ringing and other signals to be sent back to the exchange are formed and sent through the transmission control unit 76, multiplexed at the frame assembler 70, and sent from the driver 71 to a digital subscriber line.

Figure 7B:
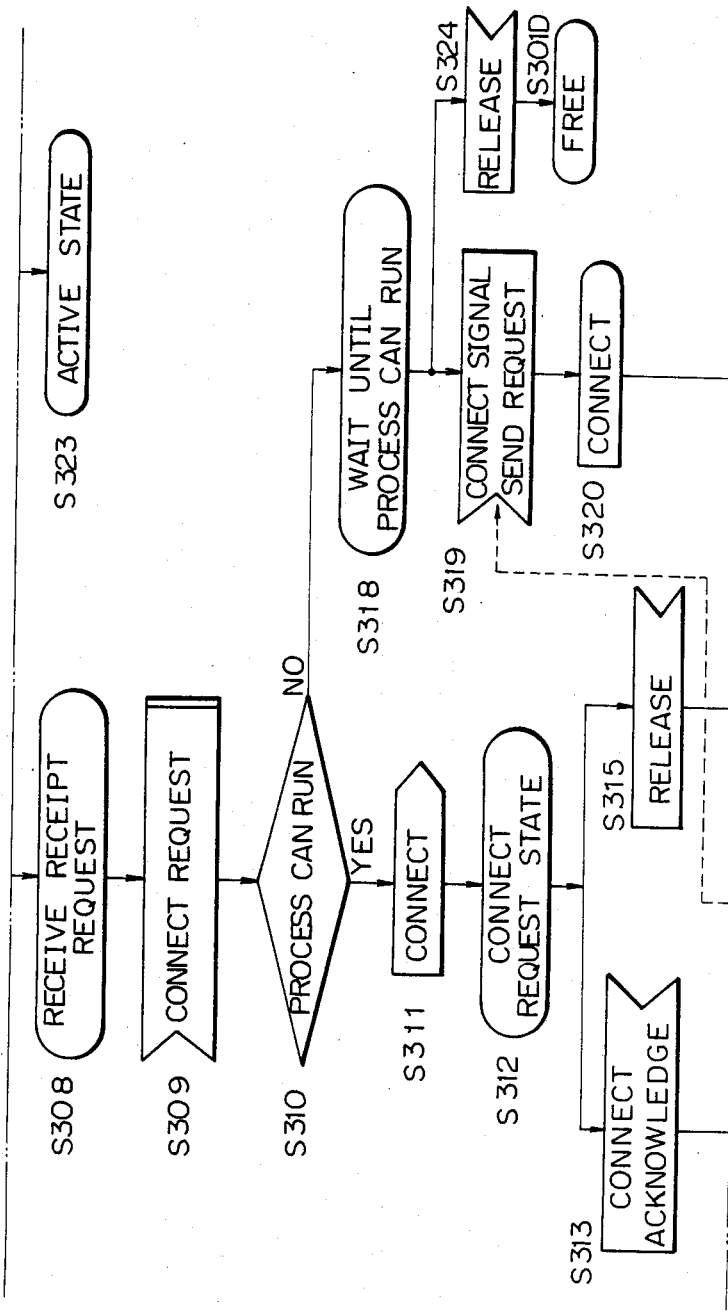
FIG. 7 including 7A-7C, is a flow chart of the terminating operation of a terminal control equipment unit of an embodiment of the present invention.
Figure 7C:
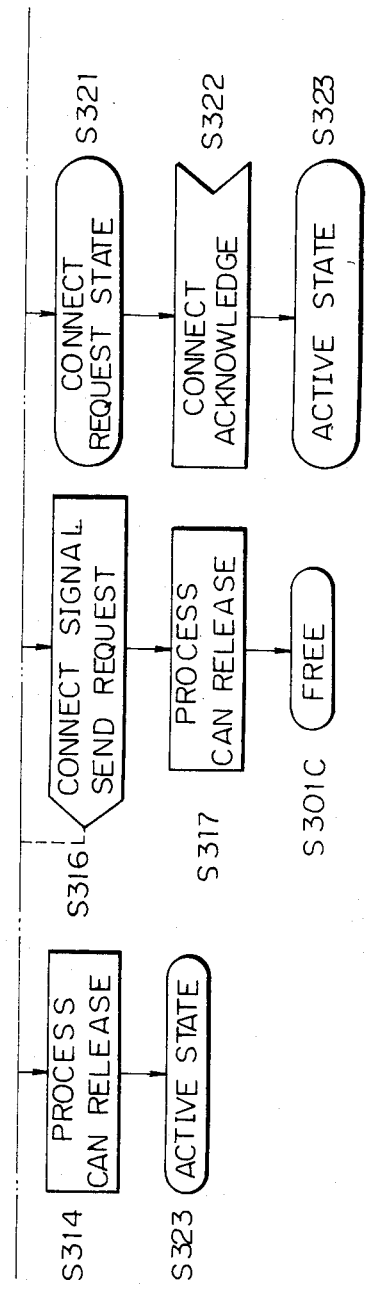

FIG. 7 is a flow chart of the main control of a terminal control equipment unit according to the present invention. The terminal control equipment unit receives a receipt request signal (step S302) from the exchange when in a free state (step S301) and performs the compatibility check (step S303). When the check is "NG", the terminal control equipment unit returns to the free state (step S301A). When the check is "OK", a check is made as to whether or not the terminal control equipment unit is in a free state (step S304). When free, a check is made whether or not the accommodated terminals are a manual connect type (step S304B). If a manual connect type, the terminal control equipment unit sends a ringing signal to the exchange (step S307). If not a manual connect type, it sends a connect signal to the exchange (step S304C), shifts into the connect request state (step S325), and, upon receipt of a connect acknowledge signal (step S326), shifts into an active state (step S323).

When not in a free state, a check is made as to whether or not the accommodated terminals are manual connect types (step S304A). When not manual, the terminal control equipment unit sends a release signal (step S306) and returns to the free state (step S301B). When manual, it decides whether or not an incoming call is in progress (step S305). When not in progress, the terminal control equipment unit sends a release signal (step S306) as the "busy" state (Step 5301B) and returns to the free state. When in progress due to a previous receipt request signal, that is, when a first call has arrived, the terminal control equipment unit sends a ringing signal in the form of the termination of the second incoming call (step S307).

Decision means for deciding whether the free state exists and decision means for deciding whether an incoming call is in progress may be constructed by logic circuits. In FIG. 6, however, they are realized by the central processor unit 78 executing programs stored in the main memory 79.

Due to the transmission of the ringing signal, the terminal control equipment unit awaits the arrival of a receipt request signal (step S308). When a connect request is made by an off-hook operation, etc. (step S309), the terminal control equipment determines if access rights have been secured, that is, if the process can run (step S310). The terminal control equipment unit operates under a multiprocessing (multitasking) system, so when two or more calls arrive simultaneously, a plurality of processes (tasks) are formed or executed. Once access rights have been secured for one process, other processes cannot run until the previous access rights are released. In other words, when one process is being executed, the other processes must wait. This process for taking care of the simultaneous arrival of two or more calls is realized by the central processor unit 78 executing programs stored in the main memory 79.

When access rights are secured, the terminal control equipment unit sends a connect signal (step S311) and enters a connect request state (step S312). When it receives a connect acknowledge signal from the exchange (step S313), the terminal control equipment unit releases the access rights (step S314) and enters an active state (step S323).

When the terminal control equipment unit is in the connect request state and receives a release request signal from the exchange (step S315), for instance, when another terminal control equipment unit sends back a connect signal to the exchange first as a terminal response, the terminal control equipment unit transfers a connect signal send request to another process, as shown by the broken line (step S316), releases the access rights, i.e., process (step S317), and returns to the free state (step S301C).

When the terminal control equipment unit cannot secure access rights, i.e., the process cannot run, it waits until the process can run (step S318). When the terminal control equipment unit receives a connect signal send request (step S319), it sends out a connect signal (step S320) and enters a connect request state (step S321). When the terminal control equipment unit receives a connect acknowledge signal from the exchange (step S322), the terminal control equipment unit enters an active state (step S323).

Figure 8A:
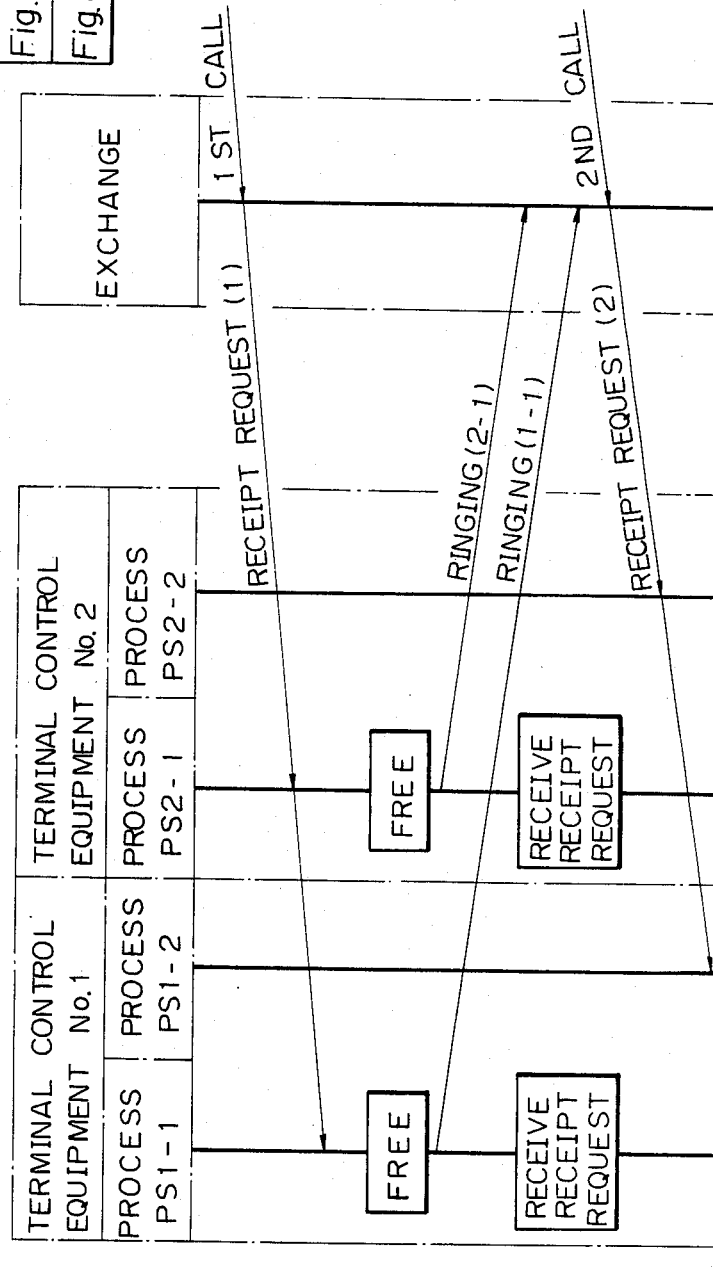
FIG. 8, including 8A-8C, and FIG. 9, including 9A-9C explain the case of simultaneous arrival of two or more calls in an embodiment of the present invention.
Figure 8C:
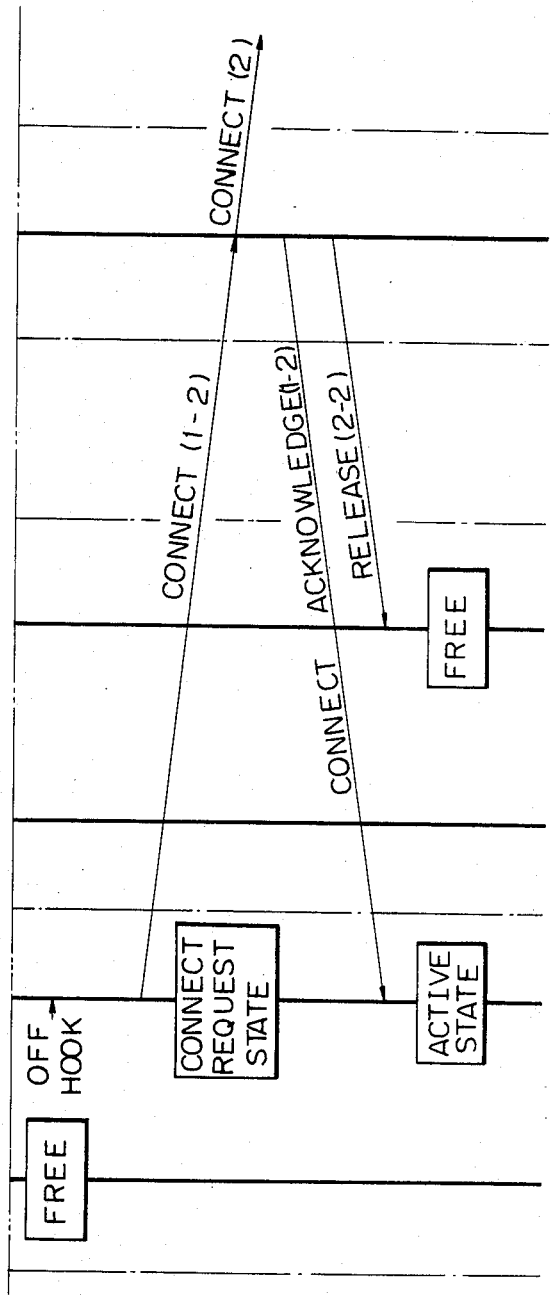

FIG. 8 explains the sequence of an embodiment of the present invention. The figure shows the case when the check of the service facility and so on is "OK". The process PS1-1 and the process PS1-2 are processes in the terminal control equipment unit 31, while the process PS2-1 and the process PS2-2 are processes in the terminal control equipment unit 32.

When a first call is received, the exchange sends a receipt request signal 1 to the terminal control equipment units 31 and 32. The terminal control equipment units 31 and 32 then send ringing signals 1-1 and 2-1 by means of the first processes PS1-1 and PS2-1, send a ringing tone to the terminals, and await a receipt request. As shown in FIG. 6, the ringing tone can be issued through application of issuance instructions to the analog circuit 61 by the central processing unit 78, through a control line a and other lines. When the exchange 1 transfers a receipt request signal 2 to the terminal control equipment units 31 and 32 due to the arrival of a second call before a response to the first incoming call, which corresponds to the incoming call in progress state in the flow chart of FIG. 7, the terminal control equipment units send ringing signals 2-1 and 2-2 using the second processes PS1-2 and PS2-2 and await a receipt request.

When the terminal control equipment unit 32 issues a connect answer signal due to an off-hook operation, etc., it stops the transmission of the ringing tone and decides whether a process can run. When the terminal control equipment unit 32 secures access rights by the first process PS2-1, that is, the process can run, it sends a connect signal 2-1 and enters a connect request state using the first process PS2-1 and waits until the process can run using the second process PS2-2. The exchange 1 receives the connect signal 2-1, processes it as a connect signal 1 for the first call, and sends out a connect acknowledge signal 2-1. When the terminal control equipment unit 32 receives the connect acknowledge signal, it releases the access right and enters an active state using the first process PS2-1. The exchange 1 sends a release signal 1-1 for the first incoming call to the terminal control equipment unit 31. On receiving the release signal, the terminal control equipment unit 31 returns to the free state using the first process PS1-1.

At this time, a ringing tone is being issued to the terminals accommodated by the terminal control equipment unit 31. When an off-hook operation is performed in response to this, the terminal control equipment unit 31 sends a connect signal 1-2 using the second process PS1-2, suspends the ringing tone, and enters a connect request state. The exchange 1 receiving the connect signal 1-2, processes it as a connect signal 2 for the second incoming call, sends a connect acknowledge signal 1-2 to the terminal control equipment unit 31, and sends a release signal 2-2 to the terminal control equipment unit 32. Therefore, the terminal control equipment unit 31 enters an active state using the second process PS 1-2, while the terminal control equipment unit 32 returns to the free stating using the second process PS 2-2.

Figure 9B:
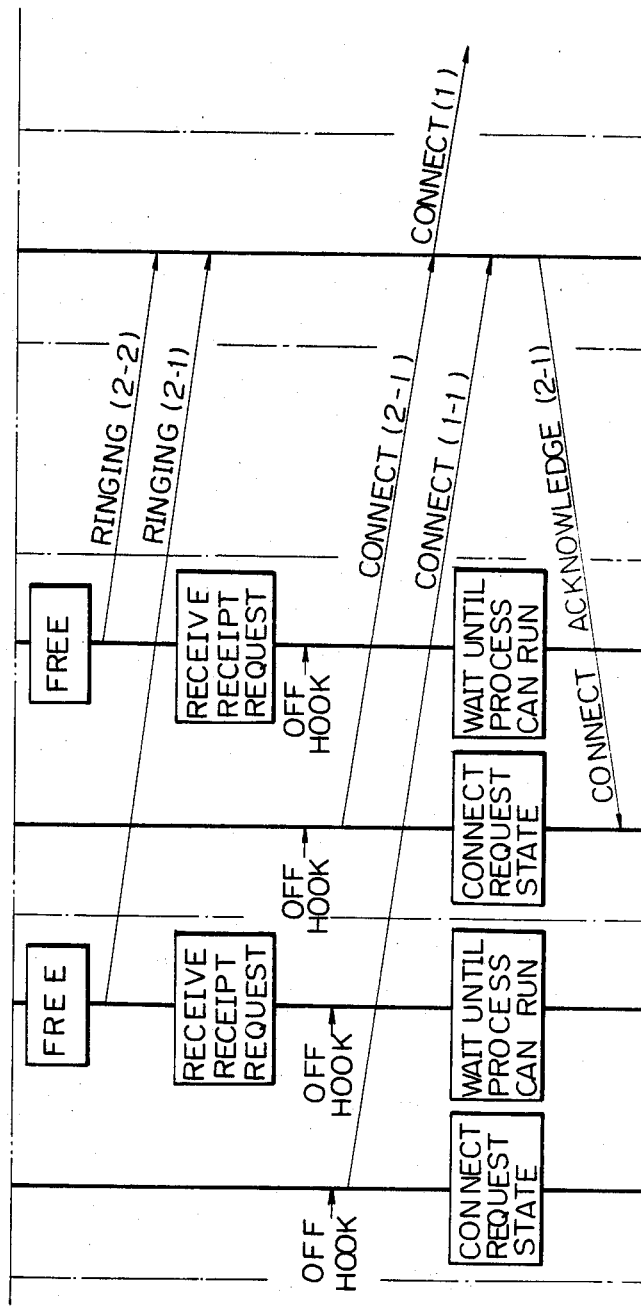

FIG. 9 explains the sequence of an embodiment of the present invention when of a simultaneous response to a first incoming call occurs. When the terminal control equipment units 31 and 32 are placed in a "receive receipt request" state by, first and second processes as a result of a first incoming call and a second incoming call, if off-hook operations or other hook responses are made almost simultaneously, the terminal control equipment units 31 amd 32 enter connect request states using the first processes PS1-1 and PS2-1 and wait until the processes can run using the second processes PS1-2, PS2-2.

The exchange 1 processes a previously received connect signal, for instance, the connect signal 2-1, (FIG 9B) as the connect signal 1 for the first incoming call, sends a connect acknowledge signal 2-1 to the terminal control equipment unit 32, and sends a release signal 1-1 to the terminal control equipment unit 31. The terminal control equipment unit 31, since this corresponds to the state of receipt of a release request signal in the connect request state in the first process, sends a request for issuance of a response to the second process in the state of waiting until the process can run, and then transmits a connect signal 1-2 using the second process PS1-2.

The exchange 1 processes the connect signal 1-2 as a connect signal 2 for the second incoming call and transmits a connect acknowledge signal 1-2 to the terminal control equipment unit 31 and a release signal 2-2 to the terminal control equipment unit 32. When the terminal control equipment unit 31 receives the connect acknowledge signal 1-2, it enters an active state using the second process PS1-2. When the terminal control equipment unit 32 receives the release signal 2-2, it enters the free state using the second process PS2-2.

Therefore, the terminal control equipment unit 32 interacts with the first incoming call, and the terminal control equipment unit 31 interacts with the second incoming call. Therefore, even if a plurality of calls arrive simultaneously, connection control may be performed for answering terminals so long as there is a channel capable of communication.

Figure 10:
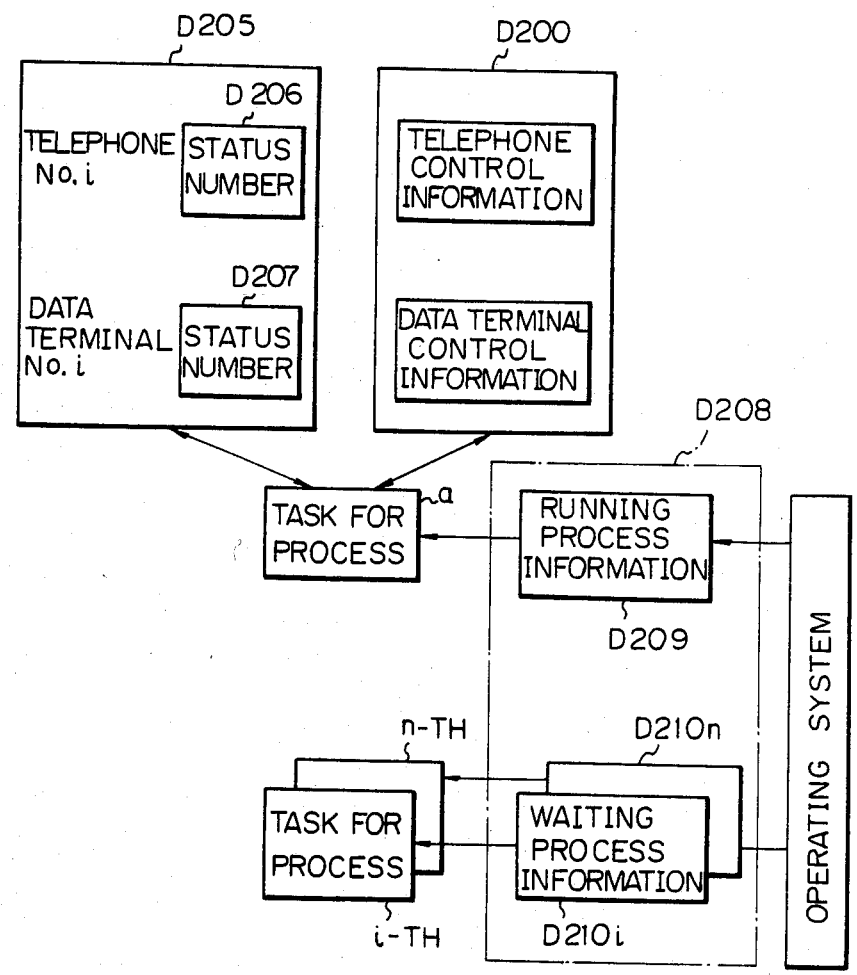
FIG. 10 explains process control in accordance with the present invention in connection with a flow of data.

FIG. 10 explains control of simultaneous arrival of a plurality of calls and process control according to the present invention, etc. in conjunction with various data. In FIG. 10, the operating system is provided with running process information D209, including the number of the running process, and waiting process information D210i through D210n, including the number of the standby process, as common data. The system further controls the execution of process a, the management of process i to process n, the formation and elimination of processes, etc. based upon the common data 208.

Inter-call data may include data on terminal speed and other information 200 necessary for the compatibility check for terminals connected to the terminal control equipment units and status information 205 composed of, for instance, status number information D206 of a telephone terminal TELi and status number information D207 of a data terminal DTi for the terminals prescribed by the service facility classes for the management of call status.

The inter-call data information D200 is illustrated in FIG. 10 as including telephone control information and data terminal control information for the case of connection of a telephone terminal and data terminal with the terminal control equipment unit. The status information 205 stores status numbers for the telephone terminal and data terminal and enables discrimination of the state of the terminals.

The compatibility check (step S303) performed after the receipt of the receipt request signal (step S302) described with respect to FIG. 7 and the check as to a manual answer (step S304A) described with respect to FIG. 7 correspond to a decision by a call status control portion as to whether the service facility information D200 is matched. The null check (step S304) and the incoming call progress check (step S305) are made based on the status information D205.

We claim:

1. A switching system method for a network having terminal control equipment units connected to a network termination unit, in which terminal control equipment units of the same kind are connected with an exchange through a subscriber's line which has assigned to it a single subscriber number and which has a plurality of communication channels, the system including storage means for each terminal control equipment unit of the subscriber's line for storing call status of incoming calls, said method comprising the steps of:
- setting, when a first incoming call is received, in the storage means of the terminal control equipment units, respective call status for the first incoming call to a ringing state;
- setting, when a second incoming call is received before a response to the first incoming call is transmitted, in the storage means, the call status for the second incoming call to a ringing state; and
- setting, when any one of the terminal control equipment units in the ringing state delivers a response, the call status for the first incoming call of the terminal control unit delivering the response to an active state, releasing the call status for the first incoming call of the other terminal control units in the ringing state, and maintaining the call status for the second incoming call.

2. A method according to claim 1, wherein said subscriber's line is a time division multiplex line.

3. A method according to claim 1, wherein said storage means are included in each of the terminal control equipment units.

4. A method according to claim 1, wherein the data stored in said storage means includes process information generated by said terminal control equipment units for each of the calls.

5. A system for controlling simultaneous arrival of a plurality of calls in a switching system, said system comprising:
- an exchange;
- digital subscriber line connected to said exchange; and
- terminal control equipment units connected to said digital subscriber line, each of said terminal control equipment units comprising:
- first decision means for deciding whether said terminal control equipment unit is in a free state;
- second decision means for deciding whether an incoming call terminating state is in progress when the decision by said first decision means is that said terminal control equipment unit is not in a free state; and
- execution means for executing processes corresponding to plural call terminations, performing terminating control to send a ringing signal to said exchange when the decision of said first decision means is that said terminal control equipment unit is not in a free state and the decision of said second decision means is that an incoming call terminating state is in progress, and sending a connect signal as an answer by said terminal control equipment unit to said exchange for the incoming call.

* * * * *